US011731765B2

(12) United States Patent
Jensen et al.

(10) Patent No.: US 11,731,765 B2
(45) Date of Patent: Aug. 22, 2023

(54) AIRCRAFT PASSENGER SEAT WITH ENCLOSURE

(71) Applicant: ZIM AIRCRAFT SEATING GMBH, Immenstaad am Bodensee (DE)

(72) Inventors: Alexander Jensen, Friedrichshafen (DE); Marc Dittrich, Amtzell (DE)

(73) Assignee: ZIM AIRCRAFT SEATING GMBH, Immenstaad am Bodensee (DE)

(*) Notice: Subject to any disclaimer, the term of this patent is extended or adjusted under 35 U.S.C. 154(b) by 0 days.

(21) Appl. No.: 17/821,929

(22) Filed: Aug. 24, 2022

(65) Prior Publication Data

US 2022/0402611 A1    Dec. 22, 2022

Related U.S. Application Data

(63) Continuation of application No. PCT/EP2021/055336, filed on Mar. 3, 2021.

(30) Foreign Application Priority Data

Mar. 5, 2020  (DE) ............... 10 2020 106 027.0

(51) Int. Cl.
  *B64D 11/06*    (2006.01)
(52) U.S. Cl.
  CPC ................. *B64D 11/064* (2014.12)
(58) Field of Classification Search
  CPC ... B64D 11/064; B64D 11/06; B64D 11/0602; B64D 11/0606; B64D 11/0639; B60N 2/00; B60N 2/2878
  See application file for complete search history.

(56) References Cited

U.S. PATENT DOCUMENTS 3,037,812 A * 6/1962 Monroe ............... B64D 11/06
                                                    297/359
4,394,047 A * 7/1983 Brunelle ................ B60N 2/20
                                                    16/339

(Continued)

FOREIGN PATENT DOCUMENTS

CA   2 704 847 A1    2/2003
CN   112937873 A *   6/2021   ......... B64D 11/0639

(Continued)

OTHER PUBLICATIONS

German Search Report (Application No. 10 2020 106 027.0) dated Feb. 11, 2021.

(Continued)

*Primary Examiner* — Benjamin P Lee
(74) *Attorney, Agent, or Firm* — Burr Patent Law, PLLC

(57) ABSTRACT

An aircraft passenger seat is proposed, having an enclosure and a base component of a backrest of the aircraft passenger seat, wherein the base component assumes an upright position during the use of the backrest. According to the invention, a securing device is provided for releasably securing the base component in the upright position, wherein a securing element of the securing device is adjustable from a securing position of the securing element on the securing device into a release position of the securing element, wherein, in order to lock the securing element in the securing position, a movable locking member of the securing device comes to bear against a latching contour on the securing element in such a manner that the securing element is locked in the securing position.

11 Claims, 7 Drawing Sheets

(56) References Cited

U.S. PATENT DOCUMENTS

| | | | | |
|---|---|---|---|---|
| 5,320,308 | A * | 6/1994 | Bilezikjian | B60N 2/42745 |
| | | | | 297/216.1 |
| 5,582,453 | A | 12/1996 | Leuchtmann et al. | |
| 6,749,266 | B2 * | 6/2004 | Williamson | B60N 3/002 |
| | | | | 297/452.2 |
| 8,864,227 | B2 * | 10/2014 | Funke | B64D 11/064 |
| | | | | 297/216.13 |
| 9,828,099 | B2 * | 11/2017 | Henshaw | B64D 11/0605 |
| 9,834,308 | B2 * | 12/2017 | Henshaw | B64D 11/00152 |
| 10,450,070 | B2 * | 10/2019 | Beroth | B64D 11/064 |
| 2004/0004382 | A1 * | 1/2004 | Dowty | B64D 11/06 |
| | | | | 297/354.1 |
| 2004/0104590 | A1 | 6/2004 | Kikuchi et al. | |
| 2009/0146006 | A1 | 6/2009 | Park et al. | |
| 2011/0253838 | A1 | 10/2011 | Bettell | |
| 2014/0183923 | A1 | 7/2014 | Itzinger | |
| 2015/0166183 | A1 | 6/2015 | Henshaw | |
| 2015/0284087 | A1 | 10/2015 | Henshaw | |
| 2015/0284094 | A1 * | 10/2015 | Bendele | B64D 11/0648 |
| | | | | 297/391 |
| 2016/0297534 | A1 | 10/2016 | Lee | |
| 2017/0015420 | A1 * | 1/2017 | Henshaw | B64D 11/0606 |
| 2017/0073076 | A1 * | 3/2017 | Ozaki | B64D 11/0642 |
| 2017/0113802 | A1 * | 4/2017 | Ozaki | B64D 11/0641 |
| 2018/0215469 | A1 * | 8/2018 | Uriu | B60N 2/22 |
| 2018/0346125 | A1 * | 12/2018 | Thompson | B64D 11/0619 |
| 2019/0047710 | A1 * | 2/2019 | Bell | B64D 11/064 |
| 2019/0112051 | A1 * | 4/2019 | Finlay | B64D 11/064 |
| 2019/0127071 | A1 | 5/2019 | Zheng | |
| 2020/0307801 | A1 * | 10/2020 | Reichel | B64D 11/064 |
| 2021/0179274 | A1 * | 6/2021 | Lueck | B64D 11/064 |

FOREIGN PATENT DOCUMENTS

| | | | |
|---|---|---|---|
| DE | 44 05 698 A1 | 8/1995 | |
| DE | 44 35 835 A1 | 4/1996 | |
| DE | 198 39 743 A1 | 3/2000 | |
| DE | 198 60 675 C1 | 5/2000 | |
| DE | 102 14 380 C1 | 10/2003 | |
| DE | 10 2018 108 351 A1 | 10/2019 | |
| EP | 0 854 063 A2 | 7/1998 | |
| EP | 3374264 B1 * | 1/2022 | B64D 11/0639 |

OTHER PUBLICATIONS

International Search Report and Written Opinion (Application No. PCT/EP2021/055336) dated Jun. 17, 2021 (with English translation).

International Preliminary Report on Patentability (with amended Ch. II Claims) (Application No. PCT/EP2021/055336) dated May 19, 2022 (with English translation).

* cited by examiner

AIRCRAFT PASSENGER SEAT WITH ENCLOSURE

CROSS REFERENCE TO RELATED APPLICATIONS

This application is a continuation of International Application No. PCT/EP2021/055336 filed Mar. 3, 2021, which designated the United States, and claims the benefit under 35 USC § 119(a)-(d) of German Application No, 10 2020 106 027.0 filed Mar. 5, 2020, the entireties of which are incorporated herein by reference.

FIELD OF THE INVENTION

The present invention relates to an aircraft passenger seat with enclosure.

BACKGROUND OF THE INVENTION

In order to equip aircraft with persons on-board, such as passenger aircraft, such as, for example, long-haul aircraft, a large number of embodiments of aircraft passenger seats or seat rows usually with a plurality of aircraft passenger seats are known. A seating position of an aircraft passenger seat has a seat base and a backrest, wherein two or more aircraft passenger seats are generally connected in alignment beside each other to form a seat row.

When the aircraft passenger seats are configured, it must be ensured that a high degree of user comfort and operating comfort can be configured with a large number of functions in a comparatively compact manner while complying with safety standards. Furthermore, provisions must be taken in order to be able to carry out the cleaning and technical maintenance of the aircraft passenger seat in an advantageous manner.

EP 0 854 063 A2 and US 2004/0104590 A1 are mentioned.

SUMMARY OF THE INVENTION

An object of the present invention is to provide an improved aircraft passenger seat which is constructed in an advantageous manner with particular regard to the user comfort and operating comfort while considering safety standards.

The present invention is based on an aircraft passenger seat comprising a stationary housing and a base component, which is arranged at a front side of the housing, of a backrest of the aircraft passenger seat, wherein the base component which is movable relative to the housing when using the backrest takes up an upright position. For example, functional components of the aircraft passenger seat are present in a region which is covered by an aircraft passenger seat backrest.

The base component preferably provides a support and attachment structure for the backrest. In the upright position of the base component, if the aircraft passenger seat can be used by a person as a seat, a longitudinal axis of the base component is upright, for example, relative to a base face, on which the aircraft passenger seat is positioned, for example, in a manner inclined by a few degrees relative to the perpendicular. Preferably, the base component is constructed to fit additional elements thereto for using the aircraft passenger seat. Such elements are particularly provided for sitting in comfort or for leaning at the rear in the aircraft passenger seat, such as, for example, upholstery elements of the backrest of the aircraft passenger seat. The base component substantially spans with the outer contour thereof a region which the backrest of the finished aircraft passenger seat takes up. The base component is preferably a substantially planar stiff component, for example, made from a carbon or metal or composite material. The base component may alternatively be a frame or framework or seat frame with mutually angularly orientated frame struts, for example, comprising metal profiles.

In the state of the aircraft passenger seat fitted in an aircraft cabin, the housing is a vertically orientated component, preferably provided on the floor area in a fixed or non-movable or stationary manner in the aircraft passenger compartment or in the aircraft cabin of the passenger aircraft. The, for example, shell-like housing or housing which preferably has surface portions preferably extends in relation to a seat direction of the aircraft passenger seat behind the base component with the housing outer contour, for example, laterally slightly beyond an outer contour of the base component or is, for example, slightly wider than the base component.

The core notion of the present invention involves a securing apparatus being provided for securing the base component in the upright position in a manner which can be cancelled, in particular, for securing to the housing, wherein a securing element of the securing apparatus can be adjusted from a securing position of the securing element with respect to the securing apparatus into a release position of the securing element, wherein, in order to lock the securing element in the securing position, a movable locking member of the securing apparatus moves into abutment against a locking contour on the securing element in such a manner that the securing element is locked in the securing position. Preferably, the locking member moves into abutment against the locking contour at the locking contour on the securing element with the action of a force or action of a resilient force. The securing element is preferably a pushing element, for example, in the form of a bolt or pin, for example, a few centimeters long. The locking member which is in the form, for example, of a latching member, is preferably able to be displaced transversely to the longitudinal direction of the securing element or resiliently moved. Thus, the locking member can lock or be latched in the locking contour with resilient pretensioning and can be resiliently bent in the opposite direction in order to cancel the locking state and therefore to reach the release position of the securing element.

As a result, a "quick release" securing is provided as a simple and rapidly releasable securing member. With the securing apparatus, a reliably configured and simply releasable securing of the upright position of the base component can be provided in a simple and compact manner. Preferably, the securing apparatus is constructed in such a manner that it can be operated manually or the securing position can be released and configured again on the aircraft passenger seat by hand, for example, with a simple hand action. The base component can preferably be folded via an articulation arrangement from the upright and usable upright position into a horizontal folded-down and non-usable position or forward in the direction of the seat base of the aircraft passenger seat. As a result, in the released state of the securing apparatus the backrest can be folded with the supporting face thereof, for example, forward and downward to such an extent that the supporting face is folded onto a seat face of the seat base or is brought into an at least virtually horizontal orientation. A front side, which was previously hidden by the base component or the backrest, of the housing is therefore at least in sections open or freely accessible from the front.

The base component being secured to the housing in a manner which can be configured with the securing apparatus accordingly secures the base component in order to prevent it from being folded down out of the upright position in one direction or into a folded-down position. With the securing element being locked in the securing position, the base component is fixed in its position or it is impossible to adjust or pivot or fold it down. In this case, the securing element engages on an anchoring portion of the securing apparatus, wherein the anchoring portion is preferably provided on the housing. The securing element is preferably adjustable in a linear manner or in the direction of the longitudinal direction thereof. The securing element is preferably adjustable in a manner guided via at least two separate bearing locations. The securing element is reversibly adjustable between the securing position and the release position. The securing apparatus is constructed in such a manner that the adjustment of the securing element in the securing position is prevented in both adjustment directions of the linear displacement. The adjustment in one direction is prevented by the locking member. The adjustment in the other direction is prevented, for example, by a mechanical stop.

The securing element can be locked by the locking member preferably in a pressing or clamping manner.

The securing apparatus or at least the securing element is preferably provided at a longitudinal edge, which is angled away relative to a planar portion of the base component, of the base component, in the manner of a longitudinal lateral edge. Preferably, a securing apparatus is provided at each of the two opposite longitudinal edges of the base component.

Preferably, a securing apparatus is provided on an upper edge of the base component, for example, as a third securing apparatus on the base component.

The securing element, the bearing arrangement thereof and the locking member of the securing apparatus are preferably provided on the base component. The anchoring portion is, for example, provided on the housing.

An arrangement of the force-actuated, guided securing element and/or of the locking member is alternatively possible on the housing. The anchoring portion of the securing apparatus is then preferably provided on the base component.

Advantageously, an anchoring portion of the securing apparatus is provided and the securing element of the securing apparatus can be anchored thereon in the securing position. The anchoring portion is preferably provided on the housing.

The anchoring portion preferably has a recess or an opening which is adapted to the securing element. In particular, the recess or opening is constructed for a fitting through-engagement of the securing element in the securing position thereof. Preferably, the anchoring portion comprises a receiving member having an opening, though which the securing element engages in the securing position of the securing element. The securing element does not project into the opening in the release position of the securing element or is free from the anchoring portion. The anchoring portion is preferably movably supported on the housing, for example, in a pivotable manner. The anchoring portion is constructed, for example, on a lever which is pivotably supported on the housing. The recess or opening is provided in the lever. The opening can be brought into the adjustment path of the securing element by the lever being orientated accordingly so that the securing element can be pushed through the opening in a fitting manner or engages therein in the securing position. The base component is fixed to the anchoring portion or to the housing.

According to the present invention the locking member can be moved in a resilient manner. As a result, a high level of reliability of the securing position of the securing element is achieved by the locking member being acted on by a resilient force or moving into abutment independently against the locking contour on the securing element as soon as the securing element takes up the associated position. As a result, the securing element is secured in the securing position or is acted on resiliently by the locking member. Furthermore, it is advantageously possible to cancel the securing position of the securing element by the locking member being moved counter to the resilient force, which is readily possible manually. The locking member is accordingly able to be operated manually relative to the securing element or can be moved out of a locking position on the securing element into a release position. Advantageously, the securing element can also be moved manually, for example, can be pushed back and forth.

According to a preferred variant of the present invention, the locking member is constructed to be resiliently displaceable transversely relative to the movement direction of the securing element. According to the present invention the locking member is in the form of a resilient element, for example, made from sheet metal or sheet steel. The locking member is provided, for example, on a retention element of the securing apparatus.

An advantage is also that the locking member is in the form of a leaf spring. The locking member can thereby be produced with little use of material and in a simple manner.

Another advantage results if the securing element is supported on a first bearing portion and on a second bearing portion, wherein the first bearing portion and the second bearing portion are spaced apart from each other in the longitudinal direction of the securing element by an intermediate space. As a result, a bearing, which includes the two bearing portions, of the securing element is provided so that the securing element is supported in a manner preventing tilting or in a precisely linearly movable manner. The first bearing portion and the second bearing portion are preferably provided on the retention element.

It is further advantageous that the securing element and the bearing portions are adapted to each other in such a manner that the securing element is supported both in the securing position and in the release position on the first bearing portion and on the second bearing portion. As a result, an at least two-point bearing is always provided. Preferably, the bearing is formed in such manner that in all possible positions or movement positions of the securing element is supported on both bearing portions or on the two bearing portions. This increases the operational reliability of the securing apparatus.

Accordingly, the securing element is permanently supported on the two bearing portions irrespective of the displacement position thereof. The bearing is preferably in the form of a sliding bearing. For example, as a result of two spaced-apart openings, through which the securing element engages, wherein the spacing between the two bearing portions is bridged by the securing element. Therefore, the securing element is longer than the relevant spacing of the two bearing locations, preferably at least twice as long as the relevant spacing of the two bearing portions in the engagement direction of the securing element.

An advantage further involves a retention element being provided with two mutually spaced-apart legs, wherein the first bearing portion is provided on one leg and the second bearing portion is provided on another leg of the retention element. The retention element of the securing apparatus is preferably made from a bent sheet metal element. The retention element is, for example, screwed or riveted to the base component. The legs are preferably spaced apart from each other in a longitudinal direction of the securing element or in an introduction or movement direction of the securing element on the securing apparatus. The bearing portions which are preferably formed by an opening in each of the respective legs are provided in the legs in such an aligned manner that the securing element can be displaced through both openings in a sliding and engaging manner.

The retention element is preferably in an at least approximately U-shaped or curved manner with two legs which project at the same side in an angular manner relative to a central portion. A fitting portion for fitting the retention element, for example, to the base component, is provided on the retention element, preferably on one of the two legs. The locking member is preferably provided on the central portion, preferably so as to project in the direction in which the legs project.

It is further advantageous for the locking member to be in the form of a component which is separate from the securing element and which acts on the securing element. The locking member may be a separate component which is fitted to the retention element or may be provided on the retention element in an integral manner.

The locking member is preferably in the form of a resilient metal flap or sheet metal flap. The metal flap can move into abutment or lock with one free end-against the locking contour of the securing element and can engage or be connected with the other end with/to the retention element.

Furthermore, an advantage involves the securing element being constructed in an elongate manner with a shaft portion and a head portion, wherein the shaft portion comprises the locking contour. As a result, the securing apparatus can be formed in a space-saving and stable manner. The head portion is preferably shorter than the shaft portion and has at least in portions an external dimension which is preferably increased with respect to the external dimension of the shaft portion. The locking contour is preferably formed circumferentially externally by a lower-lying region on the shaft portion, for example, by a groove or a notch portion. The locking contour preferably has a contour portion which tapers conically in the direction of the longitudinal axis of the securing element.

The elongate shaft portion, which is cylindrical, for example, in the basic form, constitutes the main length of the securing element. The shaft portion is received on the bearing portions. The head portion is stepped from the shaft portion on the securing element, for example, with a shoulder or collar. In the securing position, the shoulder is in abutment against a stop, for example, against the leg with the first bearing portion. The head portion acts as a manually grippable operating portion of the securing element.

According to an advantageous variant, the locking contour has a notch portion, wherein the notch portion is provided on the shaft portion, wherein an external dimension of the notch portion is smaller than an external dimension of the remaining shaft portion. Preferably, the locking contour has a notch portion, wherein the notch portion is provided in a central longitudinal region and/or on an end region of the shaft portion facing away from the head portion.

The notch portion is formed to be preferably circumferentially continuous or closed relative to the longitudinal axis of the securing element or the shaft portion. Preferably, for example, the notch portion which is channel-like or in the form of a narrowed portion is constructed over a part-length of the shaft portion. The notch portion has a circumferentially extending shoulder having an axial, annular face which extends from the external diameter radially inwardly as far as a lowest notch base. The notch base is adjoined by a conical portion which widens from the notch base radially inwardly as far as the external diameter of the shaft portion. As a result, the transition from the release position to the securing position or reaching the securing position is supported by the locking member, which can be resiliently moved transversely relative to the longitudinal axis of the securing element, is guided in a manner sliding along in the locking contour over the conical portion as far as the notch base and resiliently snap-fits therein or moves into abutment therewith. As a result, a displacement of the securing element in one direction is blocked with the locking member and is possible in the other direction or release direction. Preferably, displacement of the securing element into the release position is blocked with the first notch portion, for example, in the securing position of the securing element. Accordingly, the conical portion tapers from the end facing the head portion toward the free end of the securing element.

Another notch portion in addition to the first notch portion can be provided on the shaft portion in order to block the securing element in the release position in one direction which would result in the securing element becoming released from the retention element or in order to prevent the securing element from being removed from the retention element.

It is further advantageous for at least two, preferably precisely three securing apparatuses to be provided for securing the base component in the upright position in a manner which can be cancelled.

The securing apparatuses preferably comprise two securing apparatuses, wherein one securing apparatus is provided on an external edge of the base component, respectively. The external edges relate to two opposing external edges of the base component. The two securing apparatuses are preferably provided on two horizontally spaced-apart and preferably horizontally opposite longitudinal edges of the base component. Furthermore, a third securing apparatus is preferably provided at an upper edge of the base component, for example, in the region of half of the width of the base component. If all the securing elements of the securing apparatuses provided are in the release position, the base component can be moved into the folded-down position and components or devices of the aircraft passenger seat which are hidden in the upright position of the base component or the backrest are then accessible from the front, for example, for maintenance or checking and the like. After the base component has been folded upward again, the securing elements of the two or three securing apparatuses are again brought into the securing position and the backrest is fixed, for example, to or relative to the housing.

The present invention advantageously extends to a seat row comprising two or more than two aircraft passenger seats which are provided beside each other, wherein the seat row comprises an aircraft passenger seat according to one of the embodiments described above.

As a result, all the aircraft passenger seats or individual aircraft passenger seats of a seat row can advantageously be provided with a foldable base component which can be secured in a simple and reliable manner or a backrest which is formed therewith.

BRIEF DESCRIPTION OF THE DRAWINGS

Additional features and advantages of the invention are explained in greater detail below with reference to a schematically illustrated embodiment.

DETAILED DESCRIPTION OF THE INVENTION

Figure 1:
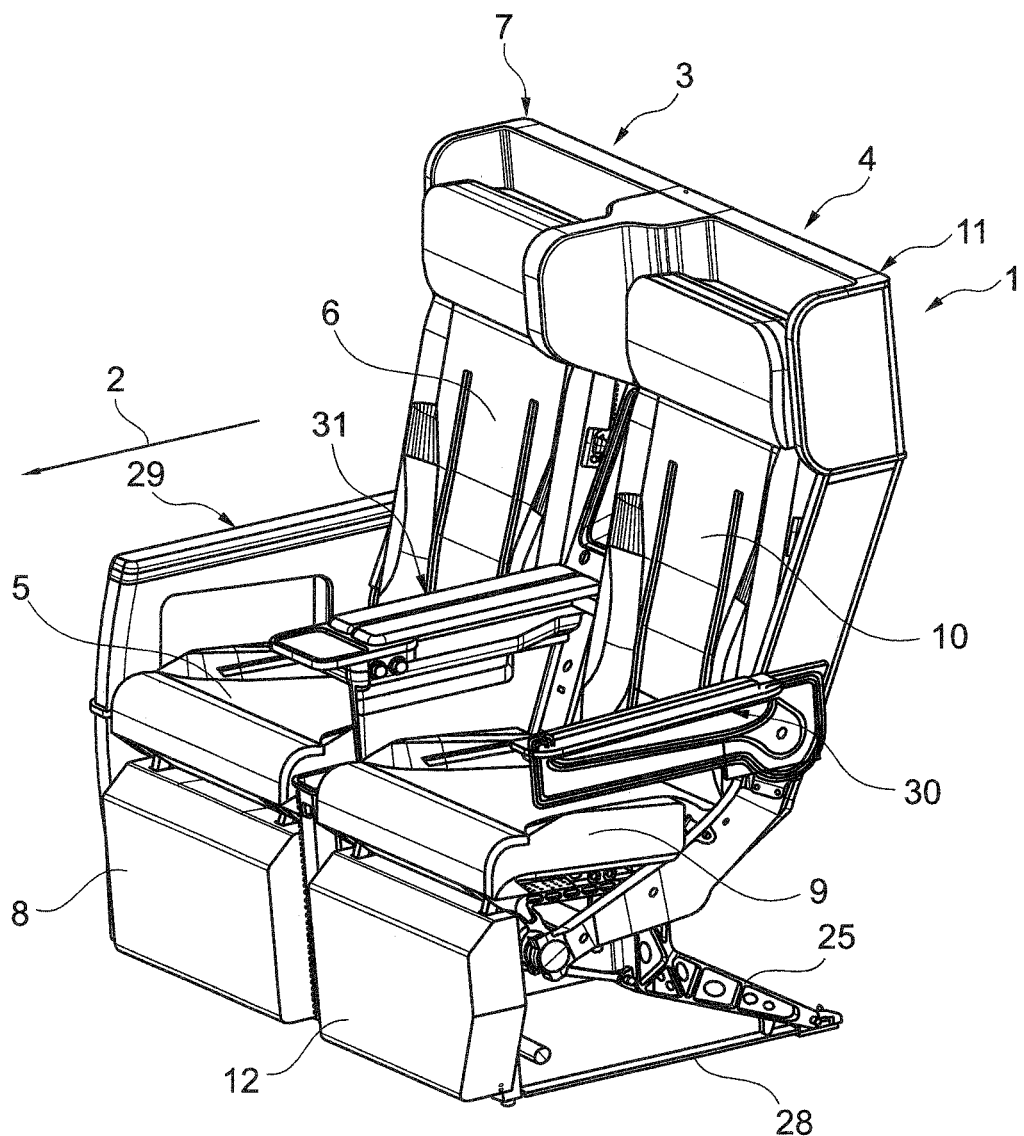
FIG. 1 shows a perspective oblique front view of a seat row having two aircraft passenger seats each comprising a seat base, a backrest with a rear housing and a leg support.

FIG. 1 shows a seat row 1 having a seat direction 2 with two aircraft passenger seats 3 and 4. Position and direction indications such as front, rear, top and bottom relate below to the seat direction 2 and the state for use of the seat row 1.

Both aircraft passenger seats 3 and 4 are constructed correspondingly. The aircraft passenger seat 3 has a seat base 5, a backrest 6 and a housing 7 which is at the rear relative to the backrest 6. Following an end region, which is located at the front, of the seat base 5, a preferably foldable leg support 8 which can be folded about a horizontal axis is provided.

Accordingly, the aircraft passenger seat 4 comprises a seat base 9, a backrest 10, a housing 11 and a leg support 12.

The seat bases 5, 9, the backrests 6, 10 and the leg supports 8, 12 comprise a preferably ergonomically formed upholstery.

The aircraft passenger seats 3 and 4 can be mounted via two support legs 13 and 14 on a cabin floor of an aircraft cabin of an associated aircraft.

To this end, the support leg 13 has a mounting position 17 at a lower end region 16 of a front strut 15 and an additional mounting position 20 at a lower end region 19 of a rear strut 18. A strut element 21 is provided between the end regions 16 and 19.

The support leg 14 has a mounting position 24 at a lower end region 23 of a front strut 22 and an additional mounting position 27 at a lower end region 26 of a rear strut 25. A strut element 28 is provided between the end regions 23 and 26.

The seat row 1 further has an external armrest 29 laterally on the aircraft passenger seat 3 and an external armrest 30 laterally on the aircraft passenger seat 4. A console 31 which can also be used by an aircraft passenger as an armrest is preferably provided between the two aircraft passenger seats 3 and 4 at the height of the two external armrests 29 and 30.

The associated backrest 6 or 10 is arranged in a shell-like form of the housing 7 or 11, respectively. The backrest 6 or 10 is preferably guided in the housing 7 or 11 in a movable manner in order to adjust different tilting positions, for example, together with the associated displaceably supported seat base 5 or 9, respectively.

The housings 7 and 11 are provided with additional elements, for example, provided at the rear with additional functions. In an upper rear region of the housings 7, 11, for example, a multimedia unit 32 for digital media is provided, for example, with an electronic input and output device or with a touch-screen.

Figure 2A:
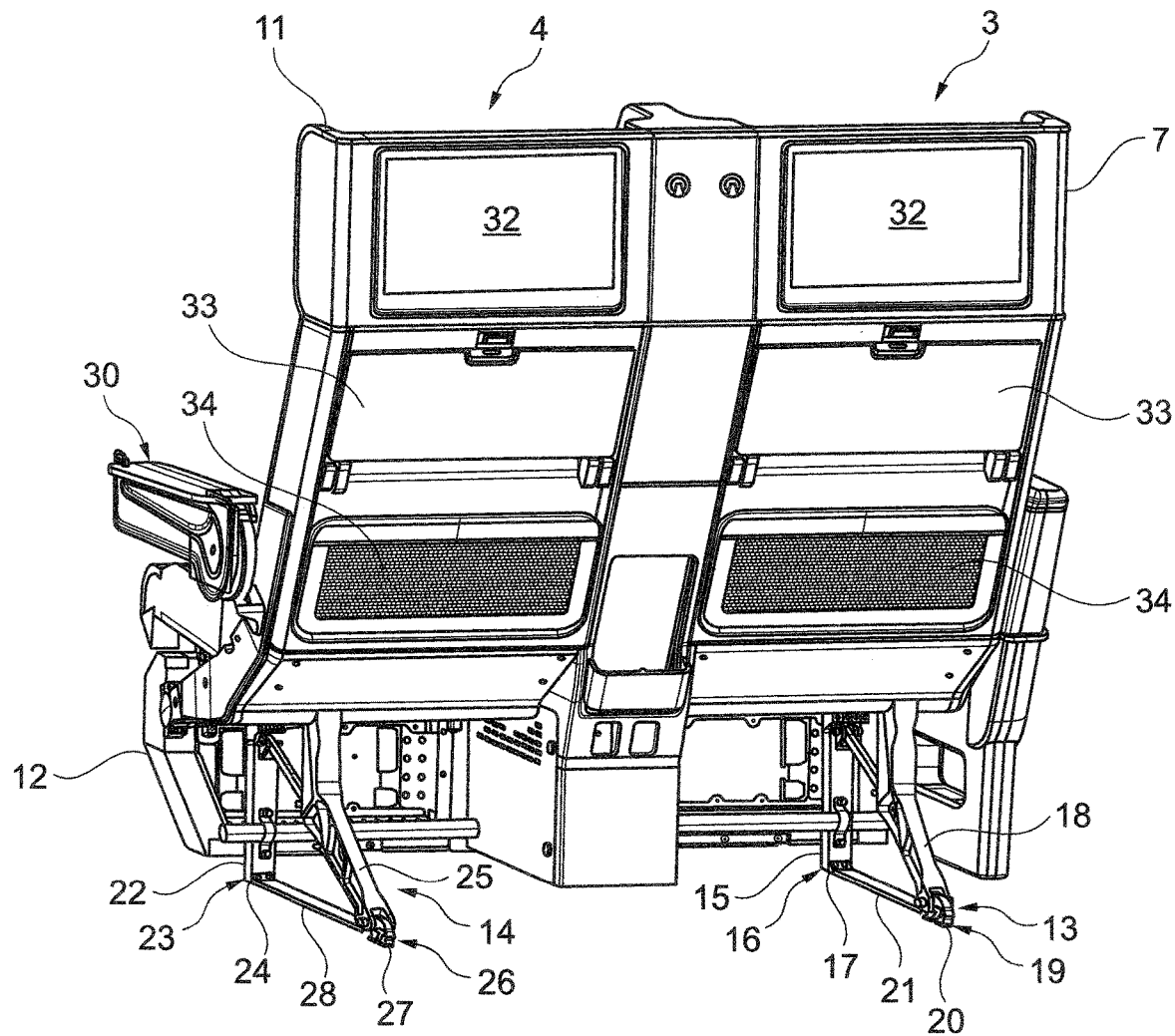
FIG. 2A shows a perspective oblique rear view of the seat row according to FIG. 1.

In an adjacent or central region below the multimedia unit 32, for example, a foldable shelf element 33, such as a tablet table with a table panel, is constructed. FIG. 2A illustrates the shelf elements 33 in an upwardly folded, vertical and secured position for non-use.

A storage compartment 34, for example, for accommodating magazines or brochures or other articles, is provided under the respective foldable shelf element 33.

Figure 2B:
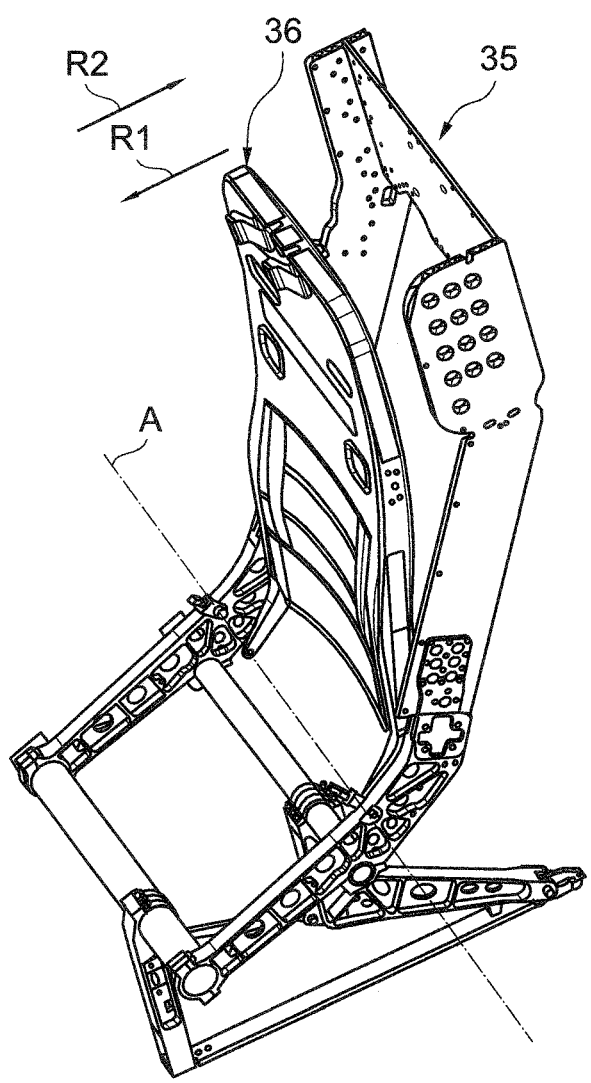
FIG. 2B shows a cutout of a base structure of an aircraft passenger seat of the seat row according to FIGS. 1 and 2A with a slightly forwardly folded base component of a backrest without any securing apparatuses.

FIG. 2B shows a perspective, oblique top view of a base structure 35 of the aircraft passenger seat 4 of the seat row 1 without any trim and upholstery elements with a base component 36, provided on the base structure 35, of the backrest 10. The base component 36 is movable relative to the base structure 35 or housing 11 or can be folded forward about an axis A according to the folding direction R1 and folded back backward in the direction R2. The base structure 35 also provides a base structure of the housing 11 of the aircraft passenger seat 4. The base component 36 is illustrated in FIG. 2B in relation to an upright position for use according to FIGS. 1 and 2A in a position folded forward slightly in the direction R1.

With reference to the aircraft passenger seat 4, therefore, the base component 36 of the backrest 10 is arranged on a front side, directed in the seat direction 2, of the housing 11 on the base structure 35 or on the housing 11 which is stationary in the aircraft cabin.

In the upright position of the base component 36 folded completely backward in the direction R2, the backrest 10 takes up according to FIG. 1 a position for use or application so that a person sitting in the aircraft passenger seat 4 can comfortably lean against the backrest 10 in an upright sitting position of the person in the aircraft passenger seat 4.

Omitted securing apparatuses 37, 38 and 39 which are explained according to FIGS. 3 to 11 are present on the base component 36 in FIG. 2B.

The cancellable securing of the base component 36 in the upright position on the base structure 35 or the housing 11 is carried out with the securing apparatuses 37, 38 and 39.

The identical securing apparatuses 37 and 38 are provided with significant elements on a longitudinal edge 40 and an opposite longitudinal edge 41 of the base component 36. These elements cooperate with an anchoring portion 45 which exists on the housing 11 and which has an opening 46. The opening 46 is provided, for example, on a component which is in the form of a lever element and which is articulated to the base structure 35.

The securing apparatus 37 comprises a securing element 42 which is displaceable in the direction S1 or in a securing direction and which is displaceable back in the direction S2. The elongate or pin-like securing element 42 has a head portion 42a and a shaft portion 42b (see FIG. 5).

Figure 5:
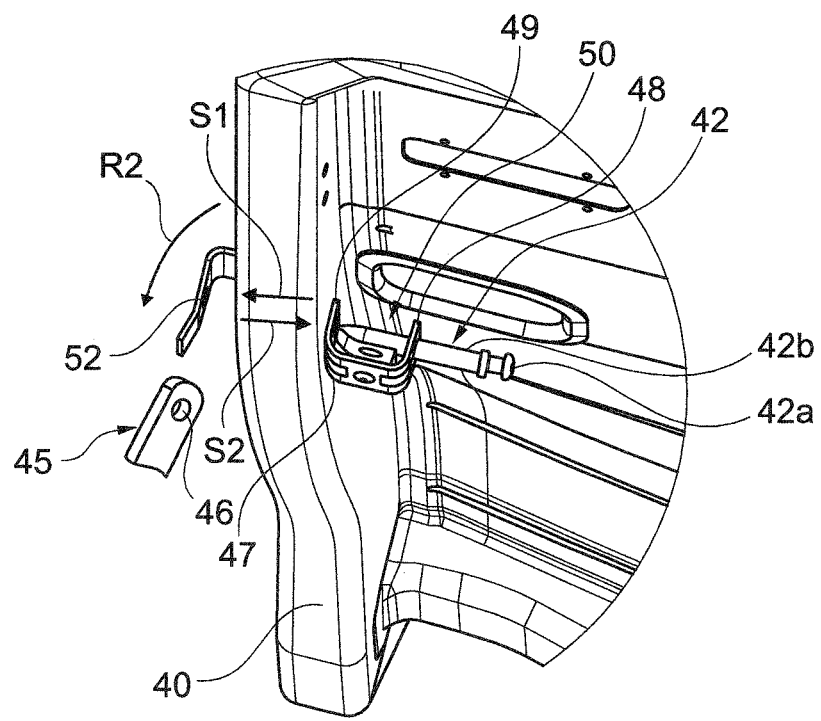
FIG. 5 shows a perspective oblique top view of the cutout according to FIG. 4.
Figure 6:
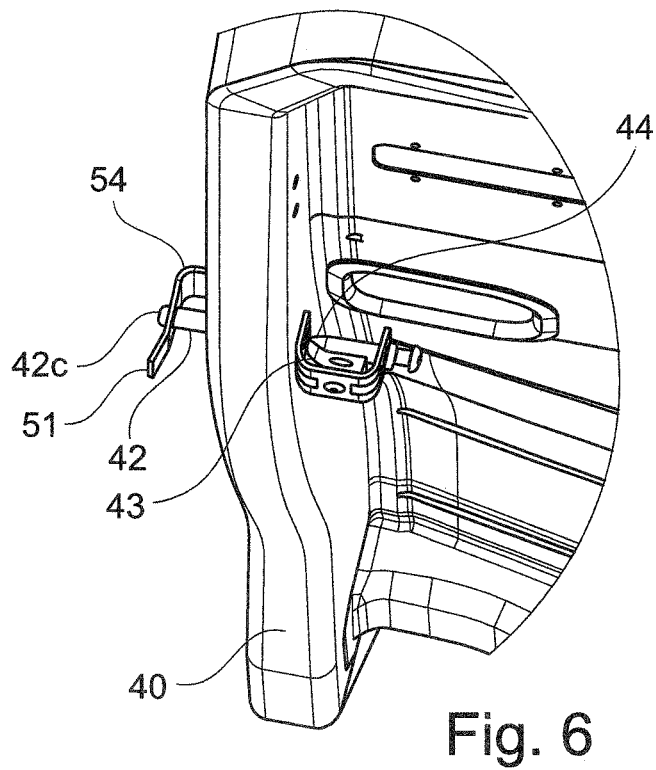
FIG. 6 shows the cutout according to FIG. 4 as another perspective view in a securing position of the securing apparatus.
Figure 7:
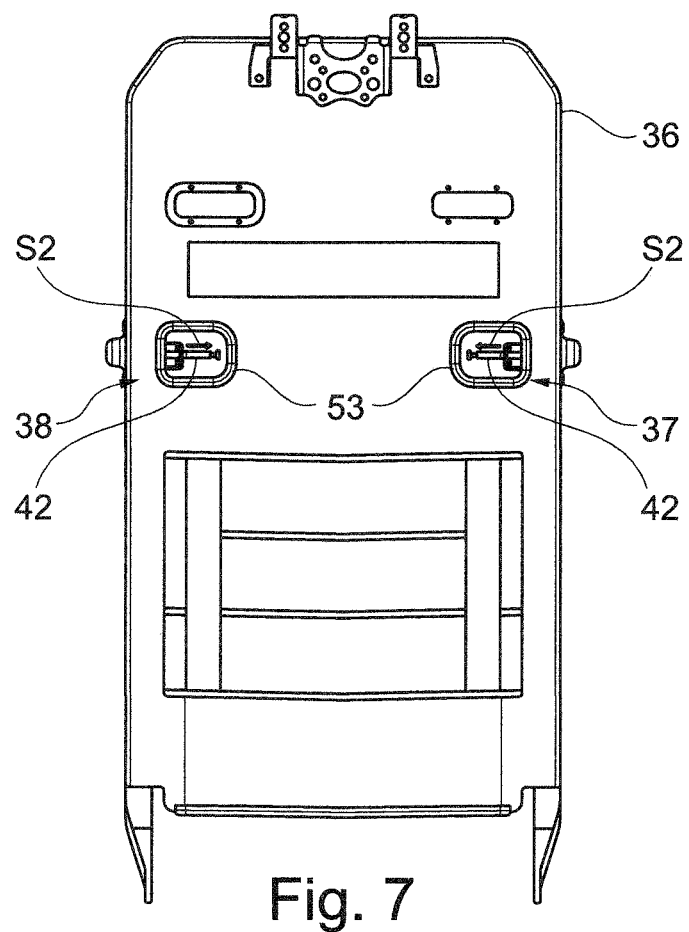
FIG. 7 shows a front view of the base component according to FIG. 3.
Figure 8:
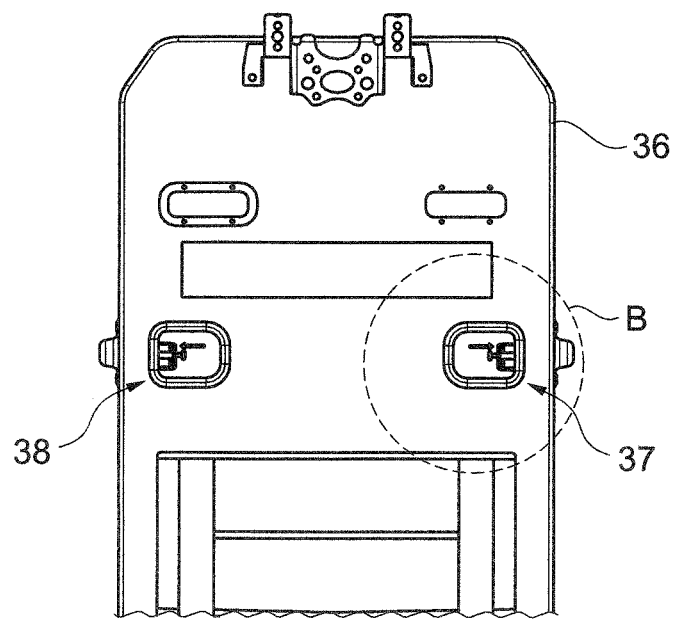
FIG. 8 shows the cutout of the base component according to FIG. 7.
Figure 9:
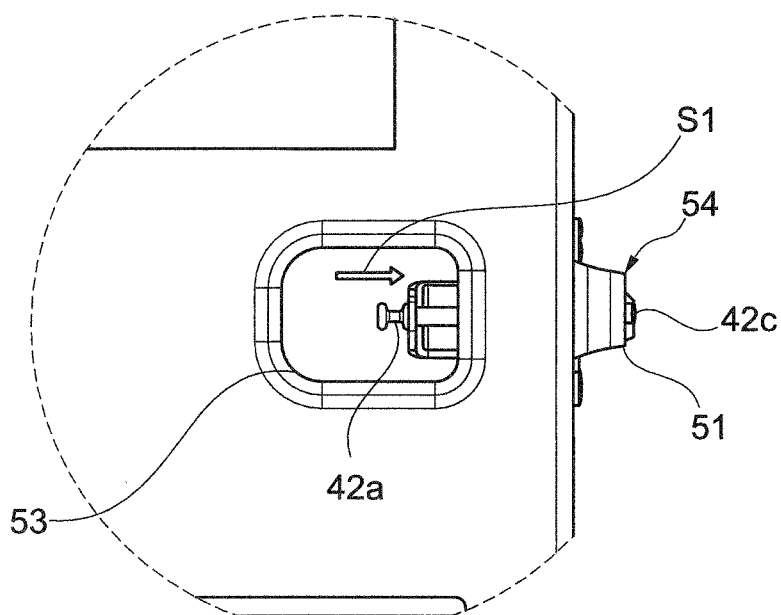
FIG. 9 shows the bordered region B in FIG. 8 shown to an enlarged scale.

The securing element 42 is adjustable out of a securing position of the securing element 42 according to FIGS. 6, 8 and 9 on the securing apparatus 37 into a release position of the securing element 42 according to FIGS. 3 to 5 and 7. In order to lock the securing element 42 in the securing position, a movable locking member 43, which is in the form of a resilient flap, of the securing apparatus 37 moves into abutment against a locking contour 44 on the securing element 42 in such a manner that the securing element 42 is locked in the securing position (see FIG. 6).

In the securing position of the securing element 42 which can be moved back and forth between the release position and the securing position linearly according to S1 and S2, the securing element 42 can be anchored on the anchoring portion 45 of the securing apparatus 37. The securing element 42 engages in the securing position through the opening 46 of the anchoring portion 45. In the release position, the securing element 42 is removed from or out of engagement with the opening 46. In FIG. 6, the anchoring portion 45 which is indicated in FIG. 5 is omitted in order to better depict the position of the securing element 42.

The locking member 43 is preferably resiliently movable. The locking member 43 is preferably constructed to be resiliently displaceable transversely relative to the movement direction of the securing element.

Preferably, the locking member 43 is in the form of a resilient flap or leaf spring.

Furthermore, the securing apparatus 37 comprises a retention element 47 with two legs 48, 49 which are spaced apart from each other. A first bearing portion, such as, for example, a through-hole, is provided in the first leg 48 of the retention element 47 and a second bearing portion, such as, for example, an additional through-hole, is provided in the second leg 49 of the retention element 47.

The securing element 42 is supported on the first bearing portion and on the second bearing portion, wherein the first bearing portion and the second bearing portion are spaced apart from each other in the longitudinal direction of the securing element 42 by an intermediate space 50.

The securing element 42 and the bearing portions are adapted to each other in such a manner that the securing element 42 is supported both in the securing position and in the release position on the first bearing portion and on the second bearing portion.

The securing element 42 is constructed in an elongate manner with the enlarged head portion 42a and the shaft portion 42b, wherein the shaft portion 42b comprises the locking contour 44.

The locking contour 44 has a notch portion, wherein the notch portion is spaced apart from the head portion 42a. An external dimension of the notch portion is less than an external dimension of the remaining shaft portion 42b.

Figure 3:
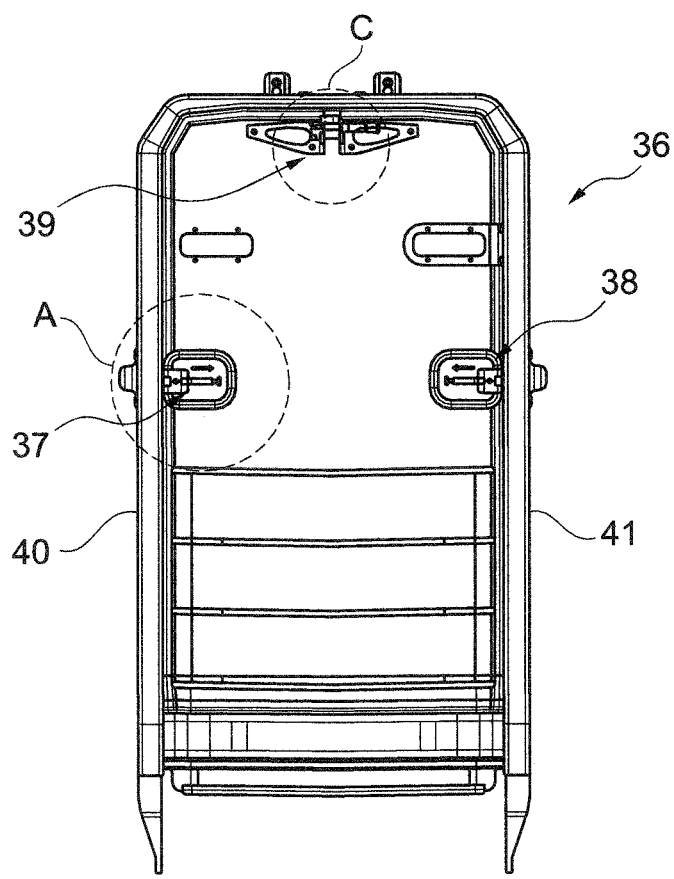
FIG. 3 shows a rear view of the base component according to FIG. 2B with securing apparatuses.
Figure 4:
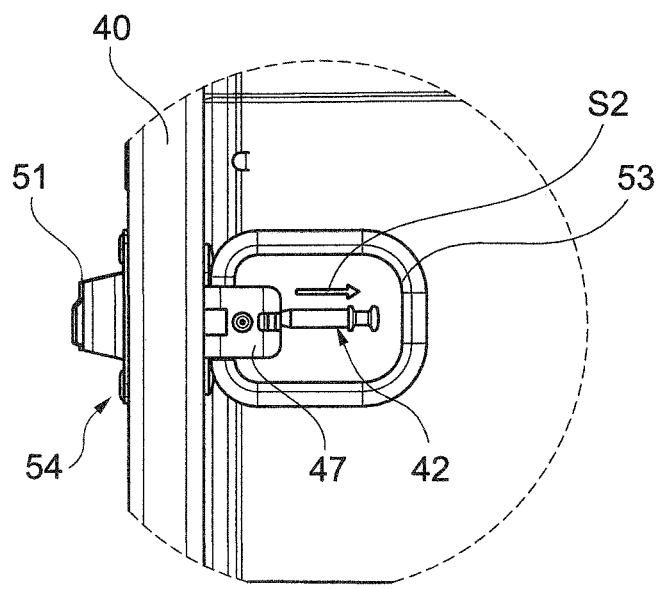
FIG. 4 shows the bordered region A in FIG. 3, drawn to an enlarged scale, with a securing apparatus in a release position.

FIGS. 7 and 8 illustrate the front side of the base component 36 with the two securing apparatuses 37, 38, wherein according to FIG. 7, as in FIG. 3 which shows the rear side of the base component 36, the securing element 42 is in the release position. This is brought about by a person who brings the securing element 42 in the direction S2 at the head portion 42a of the respective securing element 42 by pulling manually. Beforehand, the locking member 43 must be pressed away from the shaft portion 42b counter to the resilient spring force of the locking member 43 by the person in order to release the locking action so that the locking member 43, which engages resiliently in the locking contour 44, is released from the recessed locking contour 44 in the shaft portion 42b.

Since both securing apparatuses 37, 38 are constructed identically and the respective securing element 42 engages through an opening 46 in the respective anchoring portion 45, both securing elements 42 are pulled out of the respective opening 46 in the anchoring portion 45 in the release position. With the securing apparatus 39 also being released, which is explained below, the base component 36 can then be folded forward in the direction R1. Devices or elements which are provided on the front of the housing 11 are then accessible from the front for cleaning and maintenance and the like.

After the base component 36 has been folded upward in the direction R2, the securing elements 42 of the securing apparatus 37, 38 are displaced manually in the direction S1 (see FIGS. 8, 9) with an orientation which is correctly positioned with respect to the respective opening 46 so that the respective securing element 42 again engages through the respective opening 46. In this case, a free end 42c of the securing element 42 reaches through an opening 52 in a leg 51, whereby the securing element 42 is advantageously supported via an additional support position. The leg 51 is provided, for example, as a portion of a U-shaped curved member 54 of the securing apparatus 37, which U-shaped curved member 54 is fitted to the exterior of the base component 36, with a spacing from an external side of the base component 36. The associated retention element 47 and the curved member 54 are fitted internally to opposite regions and externally to the angularly backwardly projecting longitudinal edge 40 of the base component 36 (see FIGS. 4 to 6).

In order to reach or operate the securing apparatuses 37, 38 or the securing elements 42 from the front, window-like recesses 53 are present in the base component 36.

Figure 10:
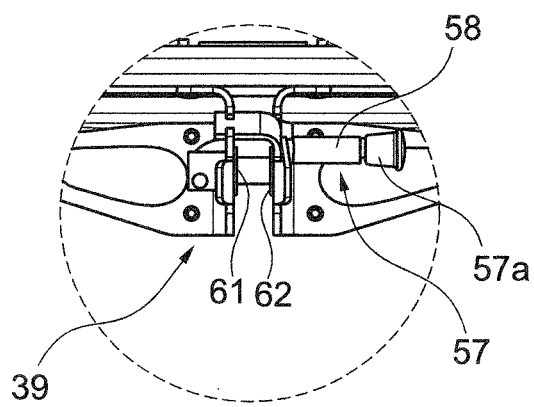
FIG. 10 shows the bordered region C in FIG. 3 shown to an enlarged scale with a securing apparatus in a securing position.
Figure 11:
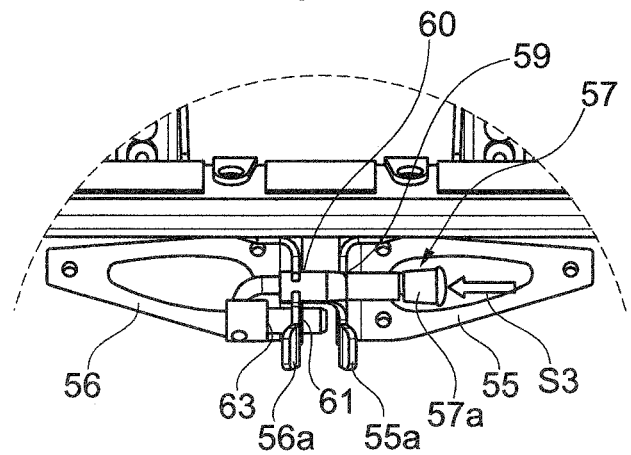
FIG. 11 shows the securing apparatus according to FIG. 10 in a release position.

The securing apparatus 39 is provided centrally under an upper horizontally orientated portion of an edge (see FIGS. 3, 10, 11).

The securing apparatus 39 comprises two flanges 55 and 56, a securing pin 57 which is, for example, in the form of a compression spring pin with a compression spring 58. The U-shaped securing pin 57 reaches with a first longitudinal portion through two aligned openings 59, 60 and with a second longitudinal portion through two additional aligned openings 61, 62 in a securing position according to FIG. 10. The openings 59, 62 are provided in the flange 55 in a leg 55a which projects angularly backward and the openings 60, 61 are provided in the flange 56 in a leg 56a which projects angularly backward. There is produced between the legs 55a and 56a an intermediate region in which an anchoring portion which is provided on the housing 7 and which is not illustrated in the Figures projects with an opening so that in the securing position according to FIG. 10 the second longitudinal portion of the securing pin 57 reaches through this opening and the base component 36 is fixed to the housing 7 at this position via an additional fixing position.

In the securing position, an edge region of the opening 61 projects into a groove 63 externally on the second longitudinal portion of the securing pin 57. The compression spring 58 is provided in a pretensioned state between the leg 55a and a head 57a of the securing pin 57 so that the securing pin 57 is urged into the securing position thereof according to FIG. 10. By pressing on the head 57a in the direction S3 (see FIG. 11), the securing pin 57 is manually brought out of the securing position counter to the compression spring force of the compression spring 58 and moved out of the opening of the associated anchoring portion so that this fixing action is cancelled and the base component 36 can be folded forward in the direction R1 with the securing apparatuses 37, 38 being released.

LIST OF REFERENCE NUMERALS

1 Seat row
2 Seat direction
3 Aircraft passenger seat
4 Aircraft passenger seat
5 Seat base
6 Backrest
7 Housing
8 Leg support
9 Seat base
10 Backrest
11 Housing
12 Leg support
13 Support leg
14 Support leg
15 Strut
16 End region
17 Mounting position
18 Strut
19 End region
20 Mounting position
21 Strut element
22 Strut
23 End region
24 Mounting position
25 Strut
26 End region
27 Mounting position
28 Strut element
29 Armrest
30 Armrest
31 Console
32 Multimedia unit
33 Shelf element
34 Storage compartment
35 Base structure
36 Base component
37 Securing apparatus
38 Securing apparatus
39 Securing apparatus
40 Longitudinal edge
41 Longitudinal edge
42 Securing element
42a Head portion
42b Shaft portion
42c End
43 Locking member
44 Locking contour
45 Anchoring portion
46 Opening
47 Retention element
48 Leg
49 Leg
50 Intermediate space
51 Leg
52 Opening
53 Recess
54 Curved member
55 Flange
55a Leg
56 Flange
56a Leg
57 Securing pin
57a Head
58 Compression spring
59 Opening
60 Opening
61 Opening
62 Opening
63 Groove

The invention claimed is:

1. An aircraft passenger seat comprising a seat base, a backrest, a foldable leg support, a stationary housing and a base component, which is arranged at a front side of the housing, of the backrest of the aircraft passenger seat, wherein the base component, which is movable relative to the housing, takes up an upright position when the backrest is being used, wherein a securing apparatus is provided for securing the base component in the upright position in a manner which can be cancelled, wherein a securing element of the securing apparatus can be adjusted from a securing position of the securing element with respect to the securing apparatus into a release position of the securing element, wherein, in order to lock the securing element in the securing position, a movable locking member of the securing apparatus moves into abutment against a locking contour on the securing element in such a manner that the securing element is locked in the securing position, wherein the locking member can be moved in a resilient manner, wherein the locking member is in the form of a resilient element, and wherein the securing element is supported on a first bearing portion and on a second bearing portion, wherein the first bearing portion and the second bearing portion are spaced apart from each other in the longitudinal direction of the securing element by an intermediate space.

2. The aircraft passenger seat as claimed in claim 1, wherein an anchoring portion of the securing apparatus is provided and the securing element of the securing apparatus can be anchored thereon in the securing position.

3. The aircraft passenger seat as claimed in claim 1, wherein the locking member is constructed to be resiliently displaceable transversely relative to the movement direction of the securing element.

4. The aircraft passenger seat as claimed in claim 1, wherein the locking member is in the form of a resilient flap.

5. The aircraft passenger seat as claimed in claim 1, wherein the securing element and the bearing portions are adapted to each other in such a manner that the securing element is supported both in the securing position and in the release position on the first bearing portion and on the second bearing portion.

6. The aircraft passenger seat as claimed in claim 1, wherein a retention element is provided with two mutually spaced-apart legs, wherein the first bearing portion is provided on one leg and the second bearing portion is provided on another leg of the retention element.

7. The aircraft passenger seat as claimed in claim 1, wherein the locking member is in the form of a component which is separate from the securing element and which acts on the securing element.

8. The aircraft passenger seat as claimed in claim 1, wherein the securing element is constructed in an elongate manner with a shaft portion and a head portion, wherein the shaft portion comprises the locking contour.

9. The aircraft passenger seat as claimed in claim 1, wherein the locking contour has a notch portion, wherein the notch portion is provided on the shaft portion, wherein an external dimension of the notch portion is smaller than an external dimension of the remaining shaft portion.

10. The aircraft passenger seat as claimed in claim 1, wherein three securing apparatuses are provided for securing the base component in the upright position in a manner which can be cancelled.

11. A seat row comprising at least two aircraft passenger seats which are provided beside each other, wherein the seat row has an aircraft passenger seat as claimed in claim 1.

* * * * *